No. 688,558. Patented Dec. 10, 1901.
E. THOMSON.
IGNITION TUBE.
(Application filed May 17, 1901.)
(No Model.)
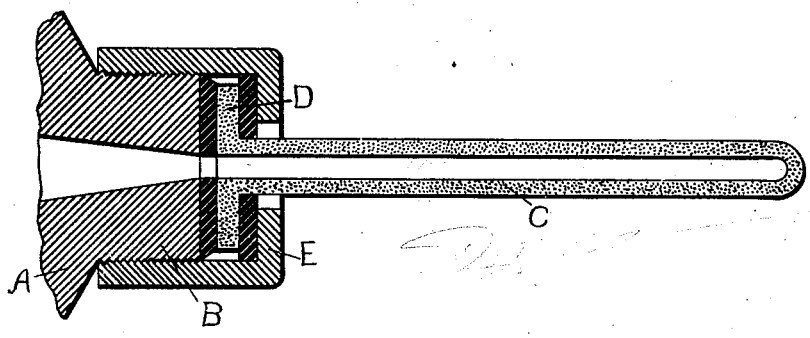
Witnesses.
Inventor.
Elihu Thomson,
by
Atty.

UNITED STATES PATENT OFFICE.

ELIHU THOMSON, OF SWAMPSCOTT, MASSACHUSETTS.

IGNITION-TUBE.

SPECIFICATION forming part of Letters Patent No. 688,558, dated December 10, 1901.

Application filed May 17, 1901. Serial No. 60,689. (No model.)

*To all whom it may concern:*

Be it known that I, ELIHU THOMSON, a citizen of the United States, residing at Swampscott, county of Essex, and State of Massachusetts, have invented certain new and useful Improvements in Ignition-Tubes, (Case No. 2,011,) of which the following is a specification.

My invention relates to ignition-tubes for gas and oil engines, and has for its object to improve their construction.

In the accompanying drawing, which illustrates an embodiment of my invention, is shown an ignition-tube in longitudinal section.

Referring to the drawing, A represents the cylinder of a gas or oil engine, and extending therefrom is a projection B, which forms a support for the ignition-tube C. The tube C is provided with a comparatively small bore, which communicates with the interior of the cylinder and is closed at the outer end. The inner end of the tube is expanded to form a flange D, and this flange is clamped in place by a nut E, two washers being provided to compensate for irregularities and for expansion. The interior of the tube communicates with the interior of the cylinder in the ordinary manner.

In order to start the engine, heat from an external source is applied to the tube, and after it is once heated it will usually remain so by reason of the heat derived from the combustible charge in the cylinder. If for any reason this heating is found to be insufficient, the external heating device may be retained.

The tube C is composed of fine quartz, which is fused at high temperature, and when so fused it possesses remarkable qualities. On account of its very low coefficient of expansion it will stand heating red hot and plunging into water and will also resist extremely-high temperatures without softening. In other words, it forms an ignition device which is practically indestructible, unoxidizable, is strong, and will resist a bright-red heat or even a white heat. An advantage of this construction lies in the fact that it will not break if water or oil is accidentally dropped thereon.

What I claim as new, and desire to secure by Letters Patent of the United States, is—

1. An ignition device for gas or oil engines comprising a body of quartz.

2. An ignition device for gas or oil engines comprising a body of fused quartz.

3. An ignition device for a gas or oil engine comprising a tube made out of fine quartz which has been fused at high temperatures.

In witness whereof I have hereunto set my hand this 14th day of May, 1901.

ELIHU THOMSON.

Witnesses:
DUGALD McK. McKILLOP,
ALEX. F. MACDONALD.